United States Patent
Netzer et al.

(10) Patent No.: US 9,360,116 B2
(45) Date of Patent: Jun. 7, 2016

(54) SEAL AND METHOD FOR MANUFACTURING THEREOF

(71) Applicant: Aktiebolaget SKF, Göteborg (SE)

(72) Inventors: Juergen Netzer, Burscheid (DE); Helmut Benedix, Leichlingen-Witzfeld (DE); Willy Seewald, Remscheid (DE)

(73) Assignee: AKTIEBOLAGET SKF, Gothenburg (SE)

( * ) Notice: Subject to any disclaimer, the term of this patent is extended or adjusted under 35 U.S.C. 154(b) by 18 days.

(21) Appl. No.: 14/108,480

(22) Filed: Dec. 17, 2013

(65) Prior Publication Data

US 2014/0175748 A1    Jun. 26, 2014

(30) Foreign Application Priority Data

Dec. 17, 2012    (DE) .................... 10 2012 223 448

(51) Int. Cl.
*F16J 15/32*    (2016.01)

(52) U.S. Cl.
CPC .................... *F16J 15/3244* (2013.01)

(58) Field of Classification Search
CPC . F16J 15/3244; F16J 15/3268; F16J 15/3232; F16J 15/324
USPC .................. 277/309, 349, 351, 353
See application file for complete search history.

(56) References Cited

U.S. PATENT DOCUMENTS

| | | | | |
|---|---|---|---|---|
| 3,661,400 A | * | 5/1972 | Weinand | 277/559 |
| 4,616,836 A | * | 10/1986 | Drygalski et al. | 277/552 |
| 5,328,178 A | * | 7/1994 | Nies | 277/438 |
| 2003/0189293 A1 | * | 10/2003 | Johnen | 277/394 |
| 2009/0224485 A1 | * | 9/2009 | Yamanaka et al. | 277/549 |
| 2010/0219588 A1 | * | 9/2010 | London et al. | 277/559 |

FOREIGN PATENT DOCUMENTS

| | | |
|---|---|---|
| DE | 10033446 A1 | 2/2002 |
| JP | 2000145975 A | 5/2000 |
| JP | 2005249104 A | 9/2005 |
| JP | 2006162015 A | 6/2006 |
| JP | 2009204039 A | 9/2009 |
| JP | 2009-204039 | * 10/2009 |

* cited by examiner

*Primary Examiner* — Kristina Fulton
*Assistant Examiner* — Nathan Cumar
(74) *Attorney, Agent, or Firm* — Bryan Peckjian; SKF USA Inc. Patent Dept.

(57) ABSTRACT

A seal includes a sealing lip having a sealing region with a pumping structure that can abut on a first component. The pumping structure causes a liquid medium to move in a direction from a first axial side of the seal towards or to a second axial side of the seal when the first component rotates relative to a second component. The pumping structure includes at least one pumping groove that extends along a direction of extension and at least one retaining structure disposed in the at least one pumping groove. The at least one retaining structure reduces a cross-section of the at least one pumping groove, in at least one direction perpendicular to the direction of extension, to a value of between 50% and 90% of an extension of the cross-section of the pumping groove outside the at least one retaining structure along the at least one direction.

20 Claims, 4 Drawing Sheets

SEAL AND METHOD FOR MANUFACTURING THEREOF

CROSS-REFERENCE

This application claims priority to German patent application no. 10 2012 223 448.9 filed on Dec. 17, 2012, the contents of which are incorporated herein by reference.

TECHNICAL FIELD

The present teachings generally relate to a seal and to a method for manufacturing a seal, e.g., for use in a fuel pump.

RELATED ART

In many fields of machine-, equipment-, and vehicle engineering, it can be challenging to adequately and durably seal two components which are rotatable with respect to one another. The seal may be required to both prevent an ingress of foreign matter into a particular piece of equipment or a machine, as well as to prevent leakage of a liquid or other media out of the interior of the particular piece of equipment or machine. Fuel injection pumps represent an example thereof, wherein for example the energy required for the pumping is provided to the pump via a rotating shaft, and wherein it is necessary to adequately seal the portion of the fuel pump that is filled with the fuel.

In the vehicle engineering field, however, similar challenges also occur in other contexts, including for example in the engine as well as other components of the drive train. To cite just one example, similar challenges can arise for example with respect to input- and output shafts of the vehicle transmission. But there is also a need in other fields of machine- and equipment engineering to seal, for example, a shaft with respect to a housing or another component. The same applies not only to shafts, but also to components which may be stationary, such as for example axles, with respect to which for example an external component can rotate.

In such situations, the requirements that are placed on the seal are in part very different, and depend for example on the operating conditions of the particular piece of equipment or machine. When for example two components are supported such that they can, in principle, rotate with respect to each other but are not rotating, the seal can be said to be static. When, on the other hand, they rotate relative to each other, the seal is dynamically loaded. The dynamic and static operating states of a seal can differ greatly from each other in part with respect to their requirements and their functioning. For example, in the static operating state, the wear aspect plays a more subordinate role in the design due to the lack of relative movement of the two components with respect to each other. In contrast, in the dynamic sealing case, the sealing function can be assisted or further facilitated by incorporating appropriate pumping structures into the seal lip.

Thus, in the dynamic and static operating states, seals are often subjected to partially-conflicting constraints and objectives and thus there is a long-felt need in the art to improve the compromise between the static and dynamic sealing functions of such a seal.

SUMMARY

In one aspect of the present teachings, a seal (e.g., a rotary shaft seal) is provided for sealing a first component with respect to a second component which is rotatable relative to the first component about an axis. The seal preferably comprises a sealing lip having a sealing region configured to sealingly abut on the first component. The sealing lip includes, at least in the sealing region, at least one pumping structure configured to effect a movement of a liquid medium from a first (e.g., axial) side of the seal to a second (e.g., axial) side of the seal while the first component is rotating relative to the second component around at least one direction of rotation about the axis. The pumping structure preferably has at least one pumping groove which extends along a (e.g., substantially circumferential) direction of extension. The pumping structure preferably further has at least one retaining structure which is disposed in or on the at least one pumping groove and reduces a cross-section of the at least one pumping groove, which cross-section is perpendicular to the direction of extension along at least one direction, to a value of between 50% and 90% of an extension of the cross-section of the pumping groove outside the at least one retaining structure along the same direction.

In another aspect of the present teachings, a method is provided for manufacturing such a seal. The method preferably include providing a sealing lip, which has a sealing region configured to sealingly abut on the first component, and introducing a pumping structure at least in the sealing region of the sealing lip, wherein the pumping structure is configured to effect a movement of a liquid medium from one (e.g., axial) side of the seal to a second (e.g., axial) side of the seal while the first component rotates relative to the second component around at least one direction of rotation about an axis. As was noted above, the pumping structure preferably has at least one pumping groove, which extends along a direction of extension. The pumping structure preferably further has at least one retaining structure which is disposed in or on the at least one pumping groove and reduces a cross-section of the at least one pumping groove, which cross-section is perpendicular to the direction of extension along at least one direction, to a value of between 50% and 90% of an extension of the cross-section of the at least one pumping groove outside the retaining structure along the same direction.

In another aspect of the present teachings, a compromise can be improved between the static and dynamic sealing functions of such a seal by the providing at least one retaining (or constricting) structure in the at least one pumping groove of a pumping structure of such a sealing lip. In this aspect, and the retaining structure is configured to reduce the cross-section of the at least one pumping groove to a value of between 50% and 90% relative to at least one direction perpendicular to the direction of extension of the pumping groove. Therefore, when the seal is operating under static sealing conditions, the retaining structure functions like an interruption of, or a barrier within, the pumping groove for the liquid medium. Therefore, depending on the viscosity of the liquid medium, the liquid medium is prevented from, or is at least substantially impeded from, flowing directly through the pumping groove between the two sides of the seal, even though there is an open cross-section of between 50% and 10% in the direction perpendicular to the direction of extension.

On the other hand, because the cross-section of the at least one pumping groove of the pumping structure is only partially reduced, the dynamic pumping capability is reduced only to the extent that upon a start of the rotation of the two components relative to one another, a rapid and reliable pumping of the liquid medium from the first side to the second side of the seal also occurs due to the pumping action for a gaseous medium, which pumping action is made possible by the remaining cross-section. In other words, in certain exemplary embodiments of the present teachings, a flow-through of the liquid medium in the static sealing case can be substantially inhibited by providing only a partial blockage of the at least one pumping groove of the pumping structure; however, the pumping function can immediately start again upon initiation of relative rotation due to the remaining (open) cross-section.

In certain exemplary embodiments of the present teachings, the pumping structure can optionally include a plurality of pumping grooves, wherein each of the pumping grooves can optionally include a corresponding retaining structure. In such exemplary embodiments, the pumping grooves can be disposed, e.g., parallel to one another, so that each provides a corresponding pumping effect which, given the same direction of rotation, effects a movement of the medium from the first side of the seal to the second side of the seal.

Alternatively or additionally, the pumping structure can also include a plurality of pumping grooves, which are at least partially disposed such that the respective pumping effects from the first side to the second side of the seal are also effected for both directions of relative rotational movement of the two components with respect to one another. Depending on the specific design of the pumping grooves and/or the retaining structures, the pumping effects can be different, so that a net pumping effect of the pumping structure from the first side to the second side results. In such a case, one, some, or all of the pumping grooves of the pumping structure can intersect, e.g., the pumping grooves need not be disposed in parallel and may optionally be laid out in an intersecting pattern.

In certain exemplary embodiments, the at least one pumping groove has a height (or depth) and/or a width in the at least one direction perpendicular to the direction of extension. The height (or depth) of the pumping groove is the extension thereof along a radial direction that extends perpendicular to the (rotational) axis of the seal. The width is an extension that is perpendicular to both the direction of extension and the radial direction and can thus extend, for example, substantially parallel to the rotational axis. In such embodiments, it can be possible, using relatively simple constructive means or structural features, to reduce the cross-section of the pumping groove in the region of the retaining structure. In this way it can thus optionally be possible to simplify the manufacturing of such a seal, and thus reduce the expense required for its manufacture.

In certain exemplary embodiments, the pumping structure can optionally extend completely through the sealing region. In other words, a fluidic connection can thus exist from the first side to the second side. In such embodiments, it is preferably to utilize a retaining structure in the pumping structure in order to improve the static sealing effect of such a seal. Additionally or alternatively, it can thereby be possible to use a seal according to an exemplary embodiment in a more flexible or versatile manner, for example for different components, as will be further discussed below.

In certain exemplary embodiments, the sealing lip can optionally be formed such that the sealing region of the sealing lip abuts on a cylindrical counter-sealing surface (counterface) of the first component. In such an embodiment, the sealing region preferably extends over a length which is between 1% and 10% of the diameter of the cylindrical counter-sealing surface (as measured from the rotational axis of the seal). In such embodiments, it can optionally be possible to confine the pumping structure to a region where it is effective during operation, but that still avoids or minimizes a weakening of the material of the seal due to the incorporation of the pumping structure. Additionally or alternatively, it can also optionally be possible to simplify the manufacture of the seal and thus reduce the expense required for its manufacture.

In certain exemplary embodiments, the at least one pumping groove can optionally extend along the sealing region from the first side to the second side in a spiral-shaped or helical manner. In the absence of the above-described retaining structure, the dynamic sealing effect of such a seal can be especially advantageous, but the static sealing effect of such a seal can be insufficient. However, by incorporating a retaining structure according to the present teachings into the spiral or helical pumping groove(s), the static sealing effect of the seal can be improved without any significant deterioration of the dynamic sealing effect of such a seal.

In certain exemplary embodiments, the at least one pumping groove can optionally extend up to both sides (or edges) of the retaining structure. In other words, the retaining structure can be disposed in an interior portion of the at least one pumping groove. In this way it can optionally be possible to improve the dynamic sealing effect using the sections of the at least one pumping groove which are disposed between the retaining structure and the first side of the seal.

In certain exemplary embodiments, the retaining structure can optionally have a length along the direction of extension of between 0.2 mm and 1 mm. By using an appropriate length of the retaining structure, it can thus be possible to provide on the one hand an effective blocking of the liquid medium in the static sealing state, without however significantly deteriorating the pumping effect in the dynamic sealing state due to a retaining structure that is too long. In addition, it can optionally be possible to manufacture a retaining structure having the defined dimensions relatively simply and economically. In this way an advantageous seal according to certain exemplary embodiment can thus optionally be provided with structural features that are simple to manufacture.

Optionally, in certain exemplary embodiment, the retaining structure can have, along the direction of extension, a first flank facing towards the first side and a second flank facing towards the second side, wherein at least one of the first and the second flanks forms an angle with respect to a base of the at least one pumping groove which does not exceed 85°. In such embodiments, it can be possible to improve the inflow behavior of the retaining structure in order to thus improve the sealing effect or the pumping effect of the seal and its pumping structure in the dynamic sealing case.

In certain exemplary embodiments, the pumping structure can optionally be formed so as to effect a movement in the liquid medium substantially exclusively from the first side to the second side of the seal during movement (rotation) of the first component relative to the second component. In this case, the retaining structure can have a first flank facing towards the first side with respect to the direction of extension, and a second flank facing towards the second side with respect to the direction of extension, and the first and second flanks may be designed asymmetrical with respect to each other. Optionally, these flanks can have for example different angles relative to a base or longitudinal side of the pumping groove. In other words, the first flank may form a first angle with a base of the at least one pumping groove that may differ from a second angle formed by the second flank and the base of the at least one pumping groove. In this way it can also optionally be possible to influence the pumping effect of the retaining structure in a targeted manner. Thus for example the first flank can have a lesser angle than the second flank, so that a flowing-over of the retaining structure is facilitated by sides of the first side, whereas an appropriate pumping edge forms in front of the second flank, i.e. facing towards the second side.

In a seal according to an exemplary embodiment, the first flank can optionally form an angle of between 2° and 40° with the base of the at least one pumping groove. In addition or alternatively thereto, the second flank can form an angle of between 60° and 90° with the base of the at least one pumping groove. In other exemplary embodiments, the first angle can for example fall in the range between 5° and 25°, for example it can be 15°; the angle of the second flank (second angle) can fall in the range between 70° and 90°, for example it can be 80°. In this way the pumping effect of the pumping structure can optionally be further improved for the dynamic sealing case.

In certain exemplary embodiments, the sealing lip can optionally comprise an elastomer, for example an acrylate rubber, an ethylene/acrylic elastomer and/or a FKM (e.g., fluoroelastomer). Additionally or alternatively, the sealing lip can likewise comprise a polymer, for example polytetrafluoroethylene (PTFE). In this way in can optionally be possible to provide a particularly low-friction and/or wear-resistant sealing lip.

In another aspect of the present teachings, the seal may optionally further include a reinforcing structure configured to indirectly or directly attach the seal to the second component. In such an embodiment, the sealing lip can be indirectly, for example via an elastomer structure, or directly connected to the reinforcing structure. If the sealing lip is comprised of an elastomer, when manufacturing such a seal, the introduction of the pumping structure can comprise vulcanizing the sealing lip onto the reinforcing structure. In such a case, the providing of the sealing lip and the introduction of the pumping structure can optionally occur simultaneously in the context of a common or single process (manufacturing) step. If the sealing lip is comprised of a polymer, the introduction of the pumping structure can be performed for example by embossing. In such a case the providing of the sealing lip and the introduction of the pumping structure can occur sequentially or simultaneously to each other. Depending on the technology used, a suitable friction-fit, materially-bonded, and/or interference-fit connection can be used for the connection of the sealing lip to the optional reinforcing structure. Thus the respective components can be connected to one another for example by vulcanization, adhesion, or also by using an appropriate profiling (e.g., an interference fit). As used herein, a "friction-fit" connection results from static friction, a "materially-bonded" connection results from molecular or atomic interactions and forces, and an "interference-fit" connection results from a geometric connection of the respective connecting elements. The static friction generally presupposes a normal force component between the two connection partners.

A component can, for example, have an n-fold rotational symmetry, where n is an integer greater than or equal to 2. An n-fold rotational symmetry exists if the component in question can be rotated about an axis of rotation or symmetry by (360°/n) and still look the same, i.e. during a corresponding rotation it is substantially mapped onto itself in the mathematical sense. In contrast, with a completely rotationally symmetric embodiment of a component, with any turn of any angular extent about the axis of rotation or symmetry, the shape of the component remains the same, i.e. is substantially mapped onto itself in the mathematical sense. Both n-fold rotational symmetry and full rotational symmetry are referred to herein as rotational symmetry.

Here a "one-piece component" is understood to mean a component that is manufactured from one continuous piece of material. The term "one-piece" can therefore be synonymously used with the terms "integral" or "one-part." A "mechanical coupling" of two components comprises both a direct and an indirect coupling.

In an exemplary embodiment of a manufacturing method according to the present teachings, the above-mentioned method steps can be performed in the above-stated order, but optionally also in a different order. Thus individual process steps can optionally occur simultaneously, however also at least temporally overlapping one another, provided that no significant deviations from this description or the technical context results.

Exemplary embodiments will be described and explained in more detail below with reference to the accompanying Figures. Further objects, advantages, designs and embodiments of the present teachings will be apparent therefrom.

DETAILED DESCRIPTION OF THE INVENTION

Figure 1:
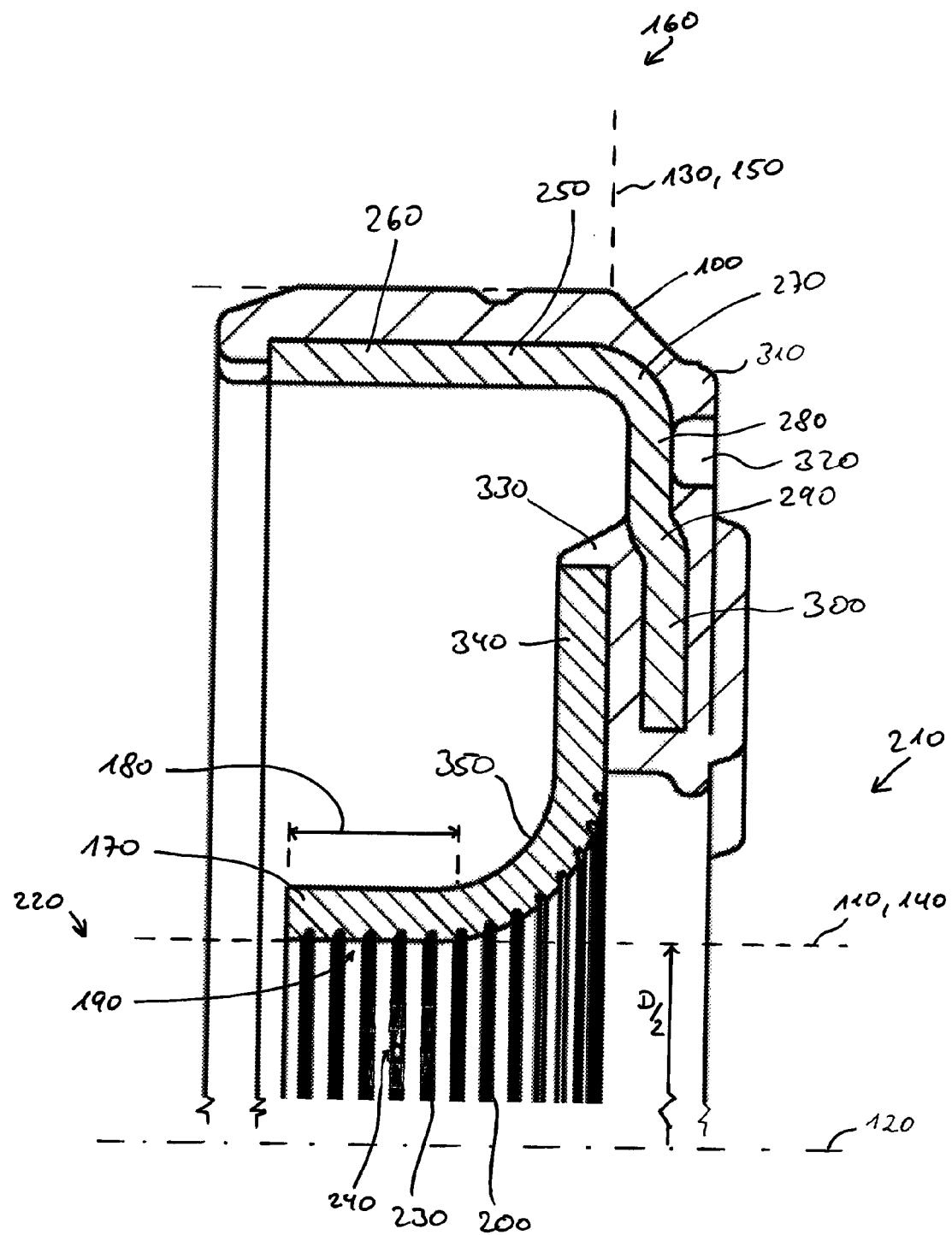
FIG. 1 shows a cross-sectional view through a seal according to an exemplary embodiment of the present teachings.

In the following description of the accompanying Figures, like reference numerals refer to like or comparable components. Furthermore, summarizing reference numerals are used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

As has already been explained, in many areas of machine-, equipment-, and vehicle engineering there is the need to provide a seal between different components which rotate relative to one another, but are however rotatably supported at least relative to each other. In this case the challenges and technical constraints of a static seal differ considerably in part from those of a dynamic seal. Whereas the two components do not move relative to each other in a static seal, in a dynamic operating state the seal must handle relative movement of the respective components with respect to one another.

In a seal designed solely for static sealing, less attention is paid, for example, to wear, since there is limited or no relative movement of the components which are rotatably supported with respect to each other, such that the seal can abut on both components without significant wear resulting. In the case of a dynamic seal, however, attention must be paid to wear for at least the reason that a relative movement of the seal or individual parts with respect to a component or even to a component of the seal cannot in principle be excluded. If significant wear of the seal were to result, it could negatively influence the functioning of the seal, whereby it can possibly even result in a total failure of the particular machine or equipment in which such a seal is used.

On the other hand, dynamic seals make it possible, with specially provided structures, to improve the dynamic sealing effect. These include pumping structures that facilitate the retention of a medium, for example of a liquid medium, in conjunction with the relative movement of the relevant components with respect to one another or by movement of the seal with respect to a component.

In principle, the term "liquid medium" can be understood herein to mean any liquid. Depending, however, on which liquid medium the seal is provided/designed for, it can optionally be advisable to select the particular materials and components in view of compatibility. Furthermore, even though a seal will be described in the following for use in a fuel injection pump of a motor vehicle, the present teachings are not at all limited to this field of use. Corresponding seals can also be needed in other fields of vehicle manufacturing, for example in the field of engines, as well as drive trains. The same also applies to other disciplines of machine- and equipment construction.

Fuel injection pump seals often require a high degree of static sealing in case the pump is subjected to a fully-flooded state. In this field, conventional seals have utilized a polytetrafluoroethylene (PTFE) disk seal provided with a spiral-shaped groove, wherein rotational movement of the seal about an axis develops (generates) a pumping effect or action. With such a conventional unidirectional PTFE disk seal, however, fuel often leaks through this groove when the system or the corresponding seal is completely flooded with fuel. This leakage is caused by the fact that the groove provides an uninterrupted fluid passage (channel) through the seal, so that the fuel can penetrate through the seal or the corresponding groove when in a static sealing state.

A "stopper" has conventionally been disposed in the region of the maximum contact force of the bent PTFE disk, which stopper completely closes off the spiral-shaped groove. However, even though the static sealing effect can be improved by incorporating such a stopper, it very often leads to a significant diminishing of the dynamic sealing performance.

Exemplary embodiments of a seal as well as a corresponding method for manufacturing such a seal can improve the compromise between the dynamic and static sealing performance of a seal.

FIG. 1 shows a cross-sectional view through a seal 100 according to an exemplary embodiment for sealing a first component 110 with respect to a second component 130 which is rotatable about an axis 120 (i.e. an axis of rotation). The first component 110 can for example be a shaft 140 and the second component 130 can be a housing 150 of a fuel injection pump. Thus, for example, the energy required for operating the fuel injection pump can be provided by the rotation of the shaft 140 of a corresponding pump.

In FIG. 1, the first component 110 and the second component 130 are depicted only in a highly simplified form as dashed lines. The seal 100 can for example be attached in or on the second component 130, i.e. in or on the housing 150 using a friction-fit, materially-bonded, or interference-fit connection. Thus for example the seal 100 can be secured in an opening in the housing 150 with a friction-fit that prevents rotation of the seal 100. A mechanical attachment of the seal 100 along the axis 120, i.e. along the axial direction, can be effected here for example by an attachment (not shown in FIG. 1) with an interference-fit of the seal 100.

The seal 100 includes a sealing lip 170, which can for example be manufactured from polytetrafluoroethylene. In other exemplary embodiments, the sealing lip 170 can include polytetrafluoroethylene (PTFE) only as a component thereof (e.g. a surface and/or a tip thereof), or can be manufactured from another polymer, or likewise also include PTFE as a component part. Herein, the term "polytetrafluoroethylene" is also understood to mean any material which also includes one or more additional materials, for example fibers or mineral material, e.g., as fillers, and/or other additives utilized in the sealing lip field. Likewise, in another exemplary embodiment, the sealing lip 170 can include an elastomer or can be manufactured from an elastomer, such as for example acrylate rubber, an ethylene/acrylic elastomer, and/or FKM (e.g., a fluoroelastomer).

The sealing lip 170 is designed with a sealing region 180 that abuts on the first component 110. The sealing region 180 can be formed for example as a counter-sealing surface 190 and may have a (hollow) cylindrical shape or an at least substantially cylindrical shape with a hollow interior. In this case, the counter-sealing surface 190 has a diameter D measured from the (rotational) axis 120. Depending on the specific implementation of a seal 100, the sealing region 180 can axially extend along the axis 120 over a length which falls in the range between 1% and 10% of the diameter D of the counter-sealing surface 190. In this context it should be understood that the position of the axis 120 in FIG. 1 is not depicted to scale.

The sealing lip 170 has a pumping structure 200 which is designed such that, when the first component 110 rotates relative to the second component 130 at least along one direction of rotation about the axis 120, a liquid medium is pumped from a first side 210 of the seal to a second side 220 of the seal, wherein the second side 220 is located on the side opposite the first side 210 in the axial direction. In other words, the pumping structure 200 is thus in the position, for at least rotation around one rotational direction about the axis 120, to pump the liquid medium from the first side 210 to the second side 220.

As was already explained above, the seal 100 shown in FIG. 1 concerns a fuel injection pump, so that in the present case the liquid medium can represent a fuel, for example a gasoline-type fuel (a gasoline), diesel fuel (diesel) or another appropriate fuel. Of course other exemplary embodiments of a seal 100 can also be used in the context of other liquid media, so that the liquid medium in this case can also be different. Seals 100 according to certain exemplary embodiments can thus be used for example in connection with oils and other lubricants as well as in connection with water and other aqueous media, in order to name only a few examples.

In the exemplary embodiment shown herein, the pumping structure 200 includes a spiral-shaped pumping groove 230. This pumping groove 230 thus extends completely through the sealing region 180 along the axial direction. In other words, due to the pumping groove 230 or the pumping structure 200, there is a fluidic connection of the first side 210 to the second side 220 through the material of the sealing lip 170. Of course, in other exemplary embodiments of the present teachings, more than one pumping groove 230 can also be implemented and they can for example extend parallel to one another, whereby the pumping effect or action can optionally be enhanced. In addition, in such embodiments, it is optionally possible to implement intersecting pumping grooves 230, in order to effect a unidirectional pumping effect of the seal 100 which is not based solely on the direction of the rotational movement.

The pumping groove 230 extends along a "direction of extension", which extends substantially circumferentially around the interior of the sealing lip 170. The pumping groove 230 has a cross-section perpendicular to the direction of extension. This cross-section is defined by a height (or depth) along a radial direction extending perpendicular to the axis 120 and/or by a width perpendicular to the direction of extension and to the radial direction. If, as shown in the present exemplary embodiment, the spiral-shaped groove 230 extends substantially perpendicular to the axis 120, the width of the pumping groove 230 substantially corresponds to a width parallel to the axis 120 (i.e. a dimension in the axial direction of the seal 100).

Since the pumping groove 230 penetrates completely through the sealing region 180 in the axial direction and is designed here as spiral-shaped, a pumping effect or action is created (generated) during relative movement, i.e. in the dynamic state during a corresponding rotational movement of the seal 100 with respect to the first component 110. On the other hand, in the static state, the liquid medium can thereby for example flow from the second side 220 to the first side 210 through the pumping groove 230, because the pumping effect or action of the pumping groove 230 or the pumping structure 200 itself is not active when there is no relative motion.

To prevent this undesirable flow-through from happening in the static state, the pumping structure 200 further has at least one retaining structure 240 disposed in or on the at least one pumping groove 230. In the exemplary embodiment shown in FIG. 1, which has only one pumping groove 230, the pumping structure 200 likewise has only one retaining structure 240. Of course, however, in other exemplary embodiments a plurality of retaining structures 240 can also be introduced into (defined within) one pumping groove 230. Likewise, in seals according to other exemplary embodiments, the seal 100 may have more than one pumping groove 230, and one or more retaining structures 240 can be provided in each of the corresponding pumping grooves, or optionally only in parts of the pumping grooves 230.

In this embodiment, the retaining structure 240 is disposed such that the pumping groove 230 extends up to both sides of the retaining structure 240. Consequently, the pumping effect, as will be further described and discussed below, of the pumping structure 200 and the pumping groove 230 can optionally be improved. Alternatively or additionally, however, it can also optionally be possible to use a seal 100 according to an exemplary embodiment in the context of different first components, i.e. for example shafts 140 having different diameters.

As will be explained in more detail, for example, in the context of FIG. 3, the retaining structure 240 is designed such that it reduces the cross-section of the pumping groove 230, along at least one direction perpendicular to the direction of extension, to a value (e.g., length or area) of between 50% and 90% of the corresponding extension of the cross-section of the pumping groove outside the region of the retaining structure 240. In this way, at least with respect to the direction perpendicular to the direction of extension, a gap remains, through which the liquid medium is inhibited or blocked from flowing from the second side 220 to the first side 210.

Thus, due to the retaining structure 240, a film of the liquid medium (e.g. an oil film or a fuel film) is inhibited or stopped under static operating conditions in the interior of the gap between the retaining structure 240 and the surface of the first component 110 (shaft 140) from flowing from the second side 220 to the first side 210, e.g., due to the narrow gap in view of the surface tension of the liquid medium. However, under dynamic operating conditions (i.e. when the shaft 140 or the first component 110 rotates relative to the seal 100), an airflow or a corresponding flow of another gaseous medium through the pumping groove 230 can start or continue despite the reduction of the cross-section to a value between 50% and 90%. This airflow passes through the retaining structure 240, thereby inhibiting or preventing the development of a low-pressure or vacuum in the interior of the spiral-shaped pumping groove 230 in the region between the oil side (second side 220) and the retaining structure 240 (also referred to as a "stopper"). Thus a sufficient pump performance for the liquid medium below the sealing lip 170 in the region of the sealing region 180 can be achieved in the dynamic state. The sealing region 180 thereby constitutes a region in which the sealing lip 170 abuts (directly) on the first component 110, i.e. on the shaft 140.

In the retaining structure 240, for example, the height and/or the width of the pumping groove 230 of the pumping structure can be reduced in accordance with the above-mentioned values with respect to their extension (length). Of course, it can also optionally be advisable to correspondingly reduce both the height and the width of the pumping groove 230 through the retaining structure 240. However, in the exemplary embodiment shown in FIG. 1, the retaining structure 240 (stopper) constitutes a barrier within the spiral-shaped pumping groove 230 of between 50% and 90% with respect to the depth or height and/or the width of the pumping groove 230.

A sealing lip 170 having the above-described pumping structure 200 or the pumping groove 230, in which the retaining structure 240 is disposed or defined, may be designed as a PTFE seal having a stopper (as shown in FIG. 1) which is optimized as compared to the above-described conventional solutions.

The seal 100 further comprises a reinforcing structure 250 which can for example be a plate made from a metallic material, for example a metal, a metal alloy, or a steel. Likewise, the reinforcing structure 250 can also be manufactured from a plastic material, for example from an injection-moldable plastic material. In this case the reinforcing structure 250 has—like the seal 100 itself—a substantially rotationally symmetric design, and, apart from a central opening, which is disposed substantially rotationally symmetric to axis 120, is designed pot-shaped. It has a first section 260 which extends substantially parallel to the axis 120. A transition section 270 connects to this section 260, and a second section 280 connects to this transition section 270, which section 280 extends substantially along the already-mentioned radial direction, i.e. perpendicular to the axis 120. A third section 300 connects via a further transition section 290, which third section 300 also extends substantially parallel to the radial direction and is offset parallel to the second section 280 along the axis 120. The third section 300 is thereby disposed offset towards the first side 210 in comparison to the second section 280.

In addition, the seal 100 includes an elastomer structure 310, which (with the exception of one or more openings 230) fully and outwardly encloses the reinforcing structure 250 in the region of the first section 260, of the transition section 270, and of the second section 280. In these regions, in the exemplary embodiment shown in FIG. 1, the elastomer structure 310 does not extend into the interior of the pot-shaped reinforcing structure 250. In the exemplary embodiment shown herein, the elastomer structure 310 is also designed substantially rotationally symmetric. However, in other exemplary embodiments the seal 100 and its components can optionally also be implemented differently.

In the exemplary embodiment of a seal 100 shown in FIG. 1, the elastomer structure 310 is vulcanized onto the reinforcing structure 250 which is formed from the metallic material. The openings 320 thereby serve for mechanically fixing the reinforcing structure 250 during the vulcanizing process; they are thus necessary only for this manufacturing process, but not for the operation of the seal 100.

The elastomer structure 310 has a receiving structure 330 on a side of the radial height of the further transition section 290, which side faces towards the second side 220, onto which side of the radial height of the further transition section 290 the sealing lip 170 is bonded to a radially extending attachment section 340. A flexible section 350 connects to the attachment section 340, on the outer side of which flexible section 350, which outer side is facing towards the first side 210, the pumping structure having the pumping groove 230 is embossed in the exemplary embodiment shown in FIG. 1.

In other words, the seal 100 additionally includes the reinforcing structure 250 which is formed to be indirectly attachable to the second component 130 via the elastomer structure 310. The sealing lip 170 here is indirectly connected to the reinforcing structure 250, namely via the elastomer structure 310. The seal 100 shown in FIG. 1 is thus a seal designed in a three-part manner, which due to the connecting technologies used, however, is not separable without destroying the seal. Of course, in other exemplary embodiments the reinforcing structure 250 can also be directly connected to the second component 130. Likewise, the sealing lip 170 can also be directly connected to the reinforcing structure 250.

As was mentioned above, the retaining structure 240 is disposed such that the pumping groove 230 extends up to both sides along the direction of extension of the pumping groove 230; the direction of extension is not shown in FIG. 1. In this way and in that the pumping groove 230 extends over a significantly larger region of the flexible section than the sealing region 180, the seal 100 according to an exemplary embodiment can also be used for different first components 110 having different diameters of the counter-sealing surface 190. In other words, a seal 100 according to an exemplary embodiment can be used for different shaft diameters of a corresponding shaft 140, to name only one example. The sealing region 180 can thus for example extend over a length which extends between 1% and 10% of the shaft diameter of a corresponding shaft 140.

Depending on the specific design of a seal 100, the retaining structure 240 can be disposed, for example, in the region of the maximum contact pressure of the sealing lip 170. In this way it can optionally be possible to improve the static sealing effect of the retaining structure 240. Of course, in other exemplary embodiments the retaining structures 240 can be disposed in other positions. If a plurality of retaining structures 240 are implemented, they can be disposed both in the previously mentioned region of maximum contact pressure and outside this region.

Figure 2:
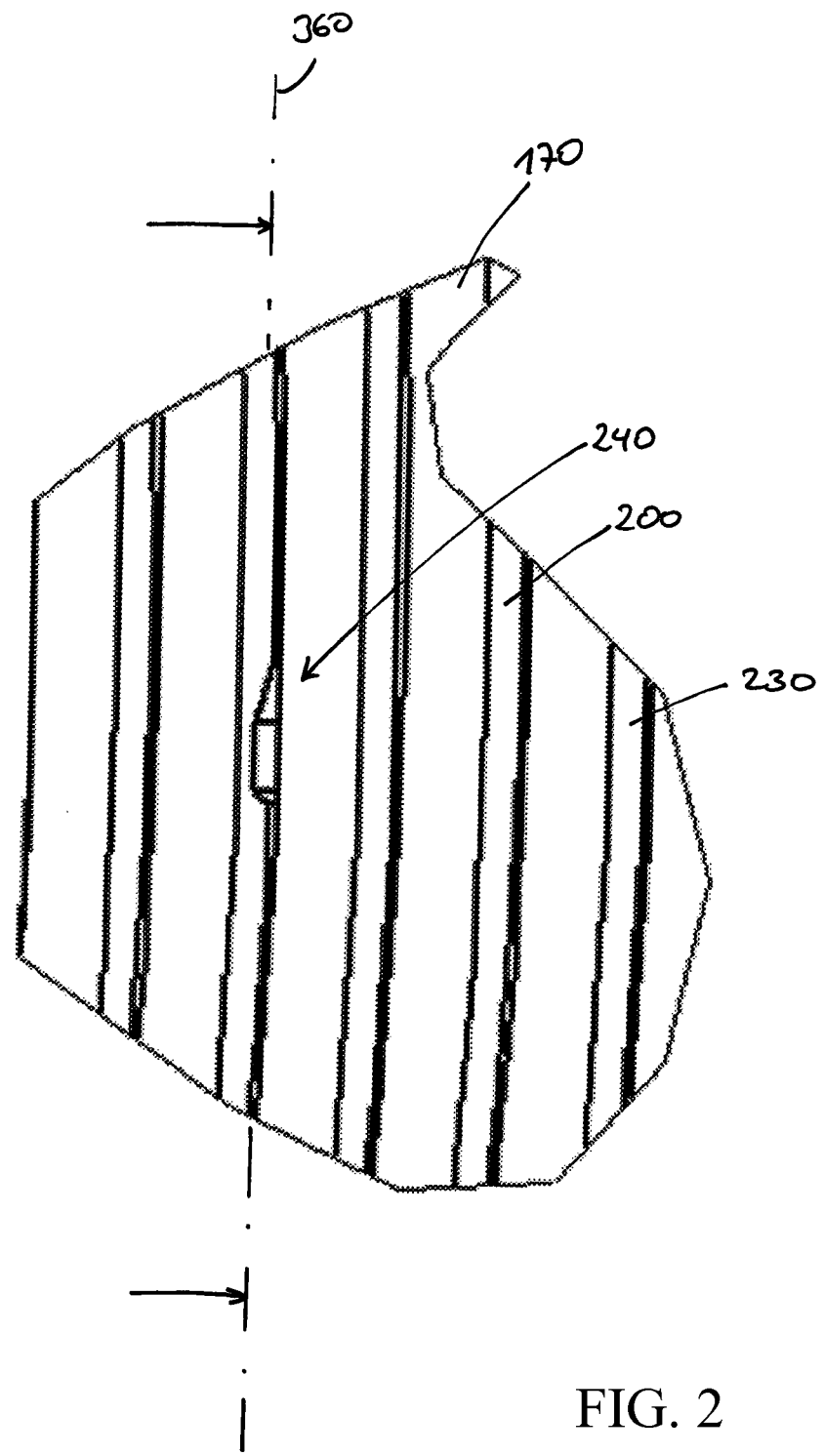
FIG. 2 shows a perspective view of a retaining structure in a pumping groove of a pumping structure in the seal shown in FIG. 1.

FIG. 2 shows a perspective representation of the sealing lip 170 in the region of the sealing region 180. FIG. 2 thus shows the pumping structure 200 having the spirally-extending pumping groove 230 in the region of the retaining structure 240. In addition, a sectional plane 360 is shown in FIG. 2, with respect to which FIG. 3 shows a corresponding cross-sectional view through the pumping structure 200 having the pumping groove 230 and the retaining structure 240.

Figure 3:
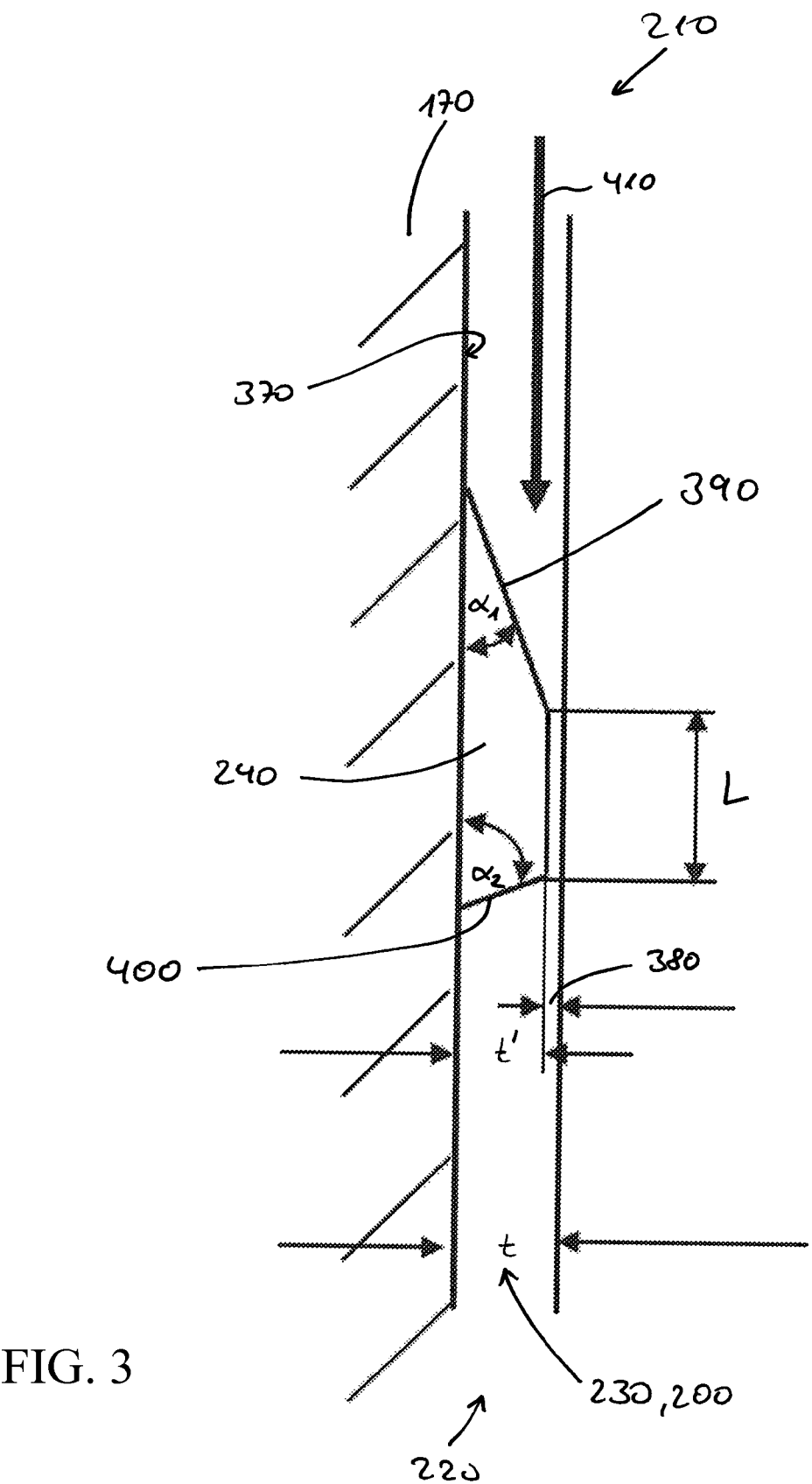
FIG. 3 shows a cross-sectional view through the pumping groove shown in FIGS. 1 and 2 having a retaining structure.

FIG. 3 shows a cross-sectional view through the sealing lip 170 along the cross-sectional plane 360 shown in FIG. 2. Here the cross-sectional plane extends through a pumping groove 230 of the pumping structure 200. In this case, the retaining structure 240 elevates over a base (longitudinal edge) 370 of the pumping groove 230 up to a height t'. The spiral-shaped pumping groove 230 here has a depth (or width) t. Depending on the specific design of a seal 100 according to an exemplary embodiment, the depth or height (and/or the width) of the retaining structure 240 corresponds here to between 50% and 90% of the depth t. In other words, the following equation is applicable:

$$t' = f \cdot t$$

wherein the proportion (value) f is in the range between 0.5 (=50%) and 0.9 (=90%). A gap 380 thereby remains above (and/or to the side of) the retaining structure 240, which gap 380 typically falls in the range between 0.01 mm and 0.07 mm, wherein however smaller or larger gaps can also be advantageously utilized in other exemplary embodiments depending upon the viscosity and/or surface tension of the liquid medium that is sealed by the seal 100.

The retaining structure 240 also has a length L of between 0.2 mm and 1 mm along the direction of extension of the pumping groove 230. In this way it can be possible to improve a compromise between static sealing and the dynamic sealing, since on the one hand, taking into account the viscosity of the liquid medium, the liquid medium is prevented from passing through the retaining structure 240, despite the only partial closing-off of the cross-section of the pumping groove 230; however an overflow or flow-around of the retaining structure 240 by air or another gaseous medium is not unnecessarily made more difficult.

The retaining structure 240 has, along the direction of extension, a first flank 390 and a second flank 400 which each form an angle (slope angle) $\alpha_1$ or $\alpha_2$ with respect to the base 370.

As was explained above, the seal 100, according to the exemplary embodiment shown in FIGS. 1 to 3, is designed in view of the pumping effect or action of the pumping structure 200 for one direction of rotation. Accordingly the pumping structure 200 has only one pumping groove 230. When the shaft 140 or of the second component 130 rotates relative to the seal 100, a pumping direction 410 of the return-flow of the liquid medium (e.g. an oil or a fuel) thus develops, as is shown in FIG. 3 by the arrow indicated with reference number 410. In other words, the pumping structure 200 is formed so as to effect a movement of the liquid medium substantially exclusively from the first side 210 to (towards) the second side 220 during rotation of the first component 110 relative to the second component 130.

In order to promote the flow of liquid medium in only one direction of the (circumferential) direction of extension of the groove 230, the first flank 390, which is directed towards the first side 210 in the (circumferential) direction of extension of the groove 230, and the second flank 400, which is directed towards the second side 220 in the (circumferential) direction of extension of the groove 230, have an asymmetric design with respect to each other. More specifically the corresponding angles $\alpha_1$ and $\alpha_2$ are different from each other. In the exemplary embodiment shown herein, the angle $\alpha_1$ of the first flank 390 is more shallow than the angle $\alpha_2$ of the second flank 400. The angle $\alpha_1$ of the first flank 390 can thus optionally fall in the range between 2° and 40°; in other exemplary embodiments it can also fall between 5° and 25°, for example—as shown in FIG. 3—it is 15°. In exemplary embodiments, the second angle $\alpha_2$ can optionally fall between 60° and 90°; in other exemplary embodiments it can fall between 70° and 90°, i.e. for example—as shown in FIG. 3—it is 80°.

Due to the smaller (shallower) angle, the liquid medium (or also a gaseous medium) can thus also more easily flow against or flow around the first flank 390, whereas the steeper second flank 400 ensures that it acts as a pumping edge for the liquid medium. That is, the liquid medium will be inhibited from flowing in the direction from the second side 220 towards the first side 210 along the (circumferential) direction of extension of the groove 230 due to the steeper angle that the second flank 400 forms with the base 370.

In the exemplary embodiment shown in FIGS. 1 to 3, the first flank 390 and the second flank 400 thus respectively form angles α1 and α2 with respect to the base 370 of the pumping groove 230 that do not exceed 85°. Of course in other exemplary embodiments a corresponding limiting of the angle can also be present in only one of the two flanks 390, 400.

Exemplary embodiments of the present teachings can thus optionally improve the function of a conventional stopper. For example, the spiral-shaped pumping groove 230 is closed off by the retaining structure 240, which is also referred to as a "stopper," only partly with respect to its height and/or its width with a ratio of between 50% and 90%. This results in that a capillary-type gap 380, which is between 0.01 mm and 0.07 mm in some exemplary embodiments, remains open between the retaining structure 240 and the counter-sealing surface 190 of the first component 110, i.e. for example of the surface contour of the shaft 140. The exemplary retaining structure 240 is also designed with asymmetric flanks 390, 400. In accordance with the oil return flow (pumping direction 410 during rotation of the shaft 140), the retaining structure 240 has a chamfer or bevel on the first flank 390 for example in the range between 5° and 25°, which promotes the flow of the liquid medium under or around the retaining structure 240. A flat surface section of a length between 0.2 mm and 1.0 mm then connects to the first flank 390, which flat surface section forms the capillary-type gap 380 with respect to the surface of the shaft 140. A second chamfer or bevel in the form of the second flank 400 then connects to this flat surface section; the second flank 400 typically forms an angle between 70° and 90° with a back side of the retaining structure 240, which assists in retaining (blocking flow-through) the film of the liquid medium in the interior of the common gap (pumping groove 230) due to the surface tension of the liquid medium.

FIGS. 1 to 3 thus show, as one exemplary embodiment of many, a seal for a fuel injection pump having a retaining structure 240 which is also referred to as a "stopper," which is disposed in the interior of the pumping groove 230 of the pumping structure 200. As has already been explained above, exemplary embodiments can however also be used in other technical fields and in the context of other technical challenges. Likewise, seals 100 according to other exemplary embodiments of the present teachings can be embodied in a variety of further optional designs, some examples of which have already been described.

Figure 4:
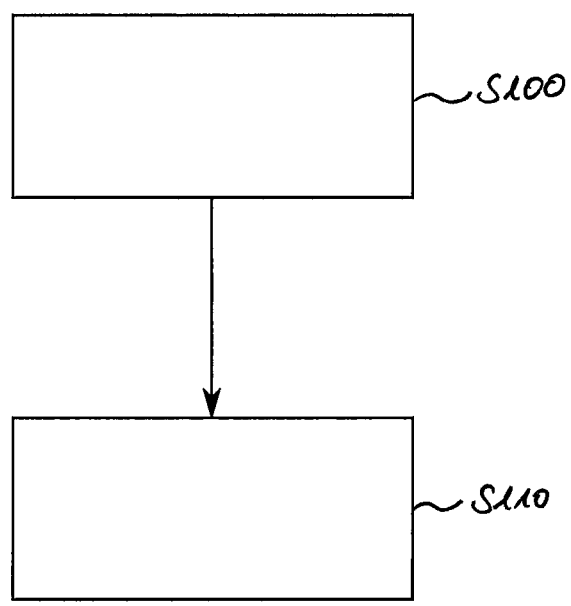
FIG. 4 shows a flow diagram of a method according to an exemplary embodiment for manufacturing a seal according to an exemplary embodiment.

FIG. 4 shows a flow diagram of a method for manufacturing a seal 100 according to certain exemplary embodiments of the present teachings. In step S100, a sealing lip 170 is first provided which is formed with the sealing region 180 so as to abut on the first component 110. In step S110, the pumping structure 200 is introduced at least into the sealing region 180 of the sealing lip 170, wherein the pumping structure 200 is formed so as to effect a movement of a liquid medium from a first side 210 of the seal 100 to a second side 220 of the seal, which side 220 is facing away along the axis 100 from the first side 210 of the seal 100, during rotation of the first component 110 relative to a second component 130 around at least one direction of rotation about an axis 120 of the seal 100. The pumping structure 200 preferably includes at least one pumping groove 230 which extends along the direction of extension. The pumping structure further has at least one retaining structure 240 which is disposed in the at least one pumping groove 230 and reduces a cross-section of the at least one pumping groove 240, perpendicular to the direction of extension along at least one direction, to a value (e.g., length or area) of between 50% and 90% of an extension of the cross-section of the at least one pumping groove 230 outside the retaining structure 240 along the same direction.

The two steps S100 and S110 of the providing of the sealing lip and the introducing of the pumping structure can be performed sequentially, partially overlapping in time or simultaneously. If for example the sealing lip 170 is manufactured from an elastomer, e.g., acrylate rubber, ethylene/acrylic elastomer, or FKM, it can be directly vulcanized onto the elastomer structure 310 or the reinforcing structure 250. In such a case the providing of the sealing lip and the introducing of the pumping structure therein can occur sequentially.

However, if the sealing lip is manufactured from a polymer, e.g., polytetrafluoroethylene (PTFE), the sealing lip 170 can be prepared first, before the pumping structure is introduced therein, for example by embossing.

The use of an exemplary embodiment can make it possible to improve a compromise between the static and dynamic sealing functions of the seal 100.

The features disclosed in the foregoing description, the following claims, and the accompanying Figures can be meaningful and can be implemented both individually as well as in any combination for the realization of an exemplary embodiment in its various embodiments.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seals, as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Seal
110 First component
120 Axis
130 Second component
140 Shaft
150 Housing
160 Pump
170 Sealing lip
180 Sealing region
190 Counter-sealing surface (counterface)
200 Pumping structure
210 First side 220 Second side
230 Pumping groove
240 Retaining structure
250 Reinforcing structure
260 First section
270 Transition section
280 Second section
290 Further transition section
300 Third section
310 Elastomer structure
320 Opening
330 Receiving structure
340 Attachment section
350 Flexible section
360 Cross-sectional plane
370 Base (longitudinal side)
380 Gap
390 First flank
400 Second flank
410 Pumping direction
S100 Providing of the sealing lip
S110 Introducing of the pumping structure

We claim:

1. A seal for sealing a first component with respect to a second component that is rotatable about an axis relative to the first component, the seal comprising:
   a sealing lip having a sealing region configured to abut on the first component,
   wherein the sealing lip includes a pumping structure at least in the sealing region, the pumping structure being configured to effect a movement of a liquid medium in a direction from a first axial side of the seal towards or to a second axial side of the seal when the first component rotates relative to the second component around at least one direction of rotation about the axis;
   the pumping structure comprises at least one pumping groove that extends along a direction of extension; and
   the pumping structure further includes at least one retaining structure disposed in the at least one pumping groove, the at least one retaining structure having an inner surface reducing a cross-section of the at least one pumping groove with respect to an outer surface of the first component, in at least one direction perpendicular to the direction of extension, to a value of between 50% and 90% of an extension of the cross-section of the pumping groove outside the at least one retaining structure along said at least one direction, and wherein
   a distance between the inner surface of the at least one retaining structure and the outer surface of the first component defines a gap.

2. The seal according to claim 1, wherein the at least one direction comprises a height and/or a width of the at least one pumping groove.

3. The seal according to claim 2, wherein the pumping structure extends completely through the sealing region in an axial direction of the seal.

4. The seal according to claim 3, wherein:
   the sealing lip is configured such that the sealing region is directly abuttable on a cylindrical counter-sealing surface of the first component,
   the cylindrical counter-sealing surface has a diameter with respect to the axis of the seal, and
   the sealing region extends over a length of the sealing lip that is between 1% and 10% of the diameter.

5. The seal according to claim 3, wherein the at least one pumping groove extends in a spiral-shaped manner from the first axial side to the second axial side through the sealing region.

6. The seal according to claim 5, wherein the at least one pumping groove extends up to both sides of the retaining structure.

7. The seal according to claim 6, wherein the retaining structure has a length along the direction of extension of between 0.2 mm and 1 mm.

8. The seal according to claim 7, wherein:
   the retaining structure has a first flank directed towards the first side in the direction of extension and a second flank directed towards the second side in the direction of extension, and
   at least one of the first and second flanks forms an angle of 85° or less with a base of the at least one pumping groove.

9. The seal according to claim 8, wherein the first flank and the second flank are asymmetric to each other.

10. The seal according to claim 9, wherein the first flank forms an angle with the base of between 2° and 40°, and/or wherein the second flank forms an angle with the base of between 60° and 90°.

11. The seal according to claim 10, wherein the first flank forms an angle of 5° and 25° with the base.

12. The seal according to claim 11, wherein the second flank forms an angle of 70° and 85° with the base.

13. The seal according to claim 12, wherein a flat surface section connects the first flank to the second flank.

14. The seal according to claim 13, wherein the flat surface section has a length of between 0.2 mm and 1.0 mm.

15. The seal according to claim 14, wherein a gap of between 0.01 mm and 0.07 mm is defined between the flat surface section and a side of the pumping groove opposite of the base.

16. The seal according to claim 1, wherein the retaining structure has a length along the direction of extension of between 0.2 mm and 1 mm.

17. The seal according to claim 1, wherein the at least one pumping groove extends up to both sides of the retaining structure.

18. The seal according to claim 1, wherein:
   the retaining structure has a first flank directed towards the first side in the direction of extension and a second flank directed towards the second side in the direction of extension,
   at least one of the first and second flanks forms an angle of 85° or less with a base of the at least one pumping groove and
   the first flank and the second flank are asymmetric to each other.

19. The seal according to claim 18, wherein the first flank forms an angle with the base of between 2° and 40°, and/or wherein the second flank forms an angle with the base of between 60° and 90°.

20. A method for manufacturing a seal, comprising:
   providing a sealing lip having a sealing region formed to abut on a first component; and
   introducing a pumping structure at least in a sealing region of the sealing lip, wherein the pumping structure is formed to effect a movement of a liquid medium from a first axial side of the seal to a second axial side of the seal during rotation of the first component relative to a second component around at least one direction of rotation about an axis of the seal, wherein the pumping structure comprises at least one pumping groove that extends along the direction of extension, and the pumping structure further includes at least one retaining structure disposed in the at least one pumping groove, the at least one retaining structure having an inner surface reducing a cross section of the at least one pumping groove with respect to an outer surface of the first component, in at least one direction perpendicular to the direction of extension, to a value of between 50% and 90% of an extension of the cross-section of the at least one pumping groove outside the retaining structure along said at least one direction, and wherein after assembly, a gaps exists between the inner surface of the at least one retaining structure and the outer surface of the first component.

* * * * *